United States Patent [19]

Megumi

[11] 3,968,286
[45] *July 6, 1976

[54] STRUCTURAL TIMBER
[75] Inventor: Naomitsu Megumi, Funabashi, Japan
[73] Assignees: Tokyo Plywood Kabushiki Kaisha, Tokyo; Naomitsu Megumi, Funabashi, both of Japan
[*] Notice: The portion of the term of this patent subsequent to Mar. 25, 1992, has been disclaimed.
[22] Filed: Oct. 9, 1973
[21] Appl. No.: 404,163

[30] Foreign Application Priority Data
Oct. 25, 1972 Japan............................. 47-106851
Oct. 25, 1972 Japan............................. 47-106852

[52] U.S. Cl. .................................. 428/99; 52/410; 428/256; 428/282
[51] Int. Cl.² ............................................ B32B 7/08
[58] Field of Search ................ 161/48, 53, 89, 112, 161/DIG. 4; 52/454, 586, 605, 615, 410; 156/71, 91, 92; 428/99, 137, 255, 256, 280, 281, 282

[56] References Cited
UNITED STATES PATENTS
| 381,439 | 4/1888 | Smith | 52/454 |
|---|---|---|---|
| 1,379,330 | 5/1921 | Budinich | 161/89 X |
| 1,387,011 | 8/1921 | Ratcliff | 161/89 |
| 1,721,461 | 7/1929 | Mazer | 181/33 G |
| 1,722,715 | 7/1929 | Teakle | 161/69 X |
| 2,133,108 | 10/1938 | Muller | 52/420 |
| 2,196,387 | 4/1940 | Elmendorf | 161/53 X |
| 2,215,150 | 9/1940 | Hannen | 161/DIG. 4 |
| 2,376,653 | 5/1945 | Boyer | 161/145 X |
| 2,417,586 | 3/1947 | Crosley | 161/DIG. 4 |
| 2,482,412 | 9/1949 | Gershon | 161/DIG. 4 |
| 2,522,527 | 9/1950 | Manning | 161/DIG. 4 |
| 2,699,416 | 1/1955 | Lyijynen et al. | 156/92 X |
| 2,788,052 | 4/1957 | Schulman | 161/89 |
| 3,094,447 | 6/1963 | Chamberlain | 156/71 |
| 3,413,188 | 11/1968 | Allen | 161/195 |
| 3,872,640 | 3/1975 | Megumi | 52/586 |

Primary Examiner—Harold Ansher
Assistant Examiner—Henry F. Epstein
Attorney, Agent, or Firm—Frank J. Jordan

[57] ABSTRACT

A structural timber is made up of an inorganic fiber felt like material, a dampproof sheet like a material, and metal net like material laid in order over a sheet like base material and stapled together whereby the staples tightly hold the materials together.

7 Claims, 10 Drawing Figures

STRUCTURAL TIMBER

BACKGROUND OF THE INVENTION

This invention relates to a material for use in buildings and structures and to a device for manufacturing the material.

In most cases of conventional structural timbers, most members are directly fastened together by means of adhesives and connectors. In the construction of the kind described it was heretofore impossible to bring into full effective use the general effect and advantages obtainable from the best use of each member in terms of its function and performance. In view of such a fact, this invention has for its object the provision of a structural timber capable of obtaining the full advantage and performance of each member used in the structures such that the state or performance capabilities of the individual members is preserved by a construction in which the members are stapled together.

A description will be set forth of embodiments of the structural timbers of this invention with reference to the accompanying drawings.

A structural timber comprises an inorganic fiber felt-like material, a dampproof sheet-like material, and a metal net-like material disposed on one another and over a sheet-like base material. The aforementioned materials are stapled to one another and held tightly together by the staples.

DESCRIPTION OF THE PREFERRED EMBODIMENTS

EXAMPLE 1

Figure 1:
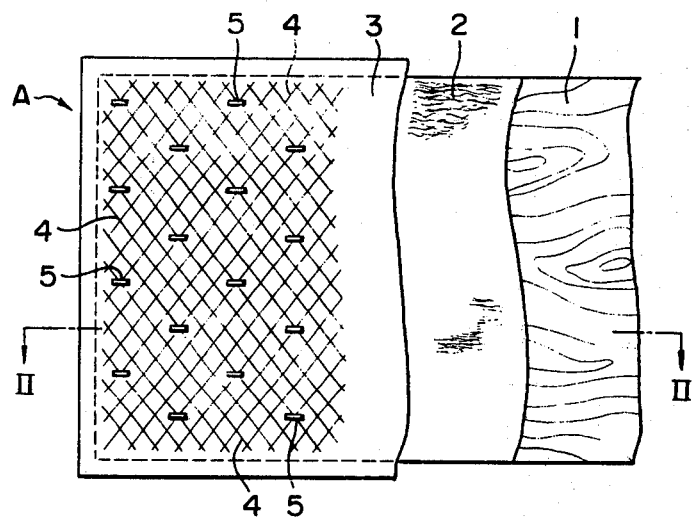
FIGS. 1, 3 and 5 are respective plan views partly broken away showing, different embodiments of the structural timber according to this invention.
Figure 2:
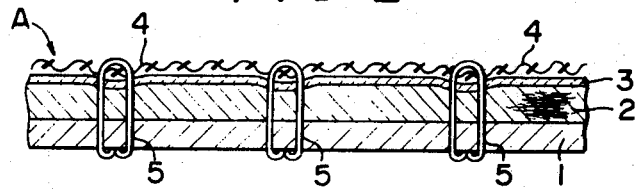
FIG. 2 is a sectional view taken along the line II—II of FIG. 1.

A description will be set forth of a structural timber A shown in FIGS. 1 and 2. The timber A is of a construction in which an inorganic fiber felt like material 2 made of glass fiber, asbestos, slag wool, rock wool, or the like, a dampproof sheet like material 3 and, a metal net like material 4 are laid in order over an antiseptically treated sheet like wood base material 1 and are stapled together and tightly held together with staples 5.

EXAMPLE 2

Figure 3:
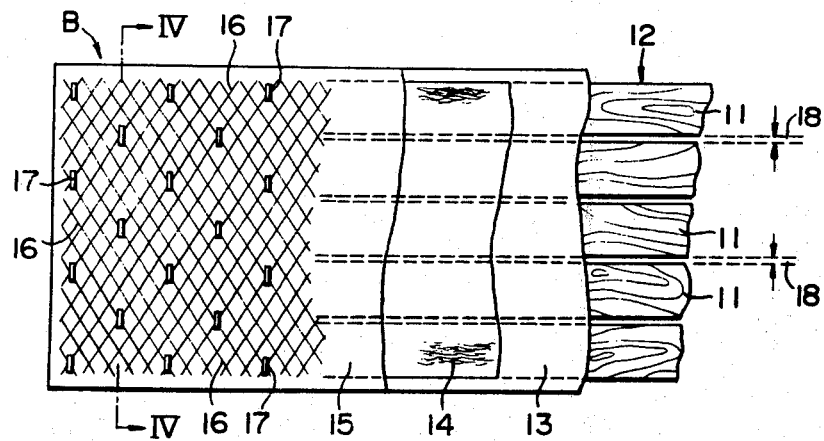
Figure 4:
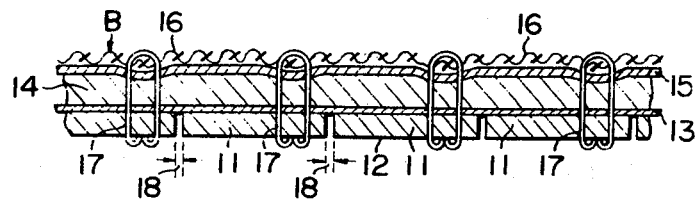
FIG. 4 is a sectional view taken along the line IV—IV of FIG. 3.

A description will be set forth of a structural timber B shown in FIGS. 3 and 4 with reference to the drawing. A plurality of antiseptically strips of sheet like base material 11 of slightly narrow width are arranged with small spaces therebetween in side-by-side relationship and the strips of material are secured by temporary stapled equipment to form a base sheet 12. A dampproof sheet like material 13 an, inorganic fiber sheet-like material 14a, dampproof sheet like material 15 and a metal net 16 are laid over one another in order and stapled together with staples 17. The sheet like base strips 11 are suitably determined in accordance with their width, their number and the width of space 18.

EXAMPLE 3

Figure 5:
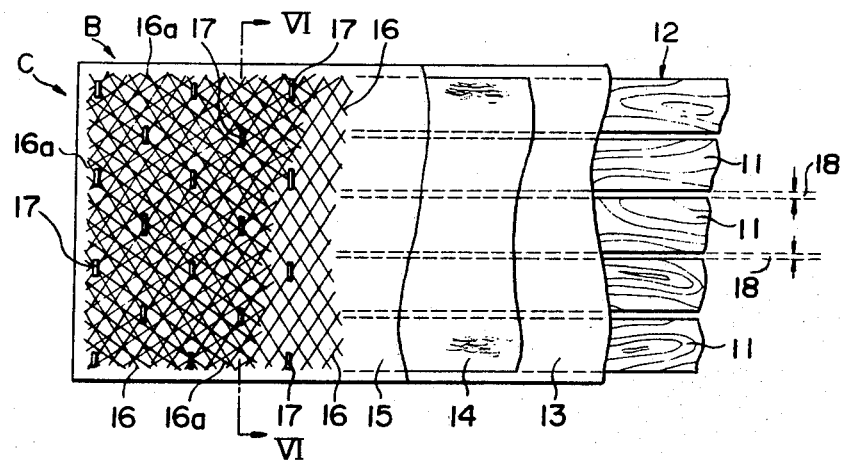
Figure 6:
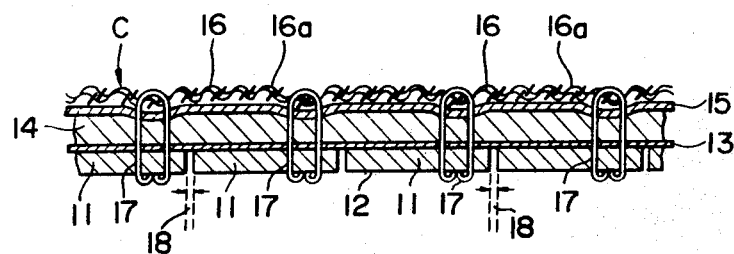
FIG. 6 is a sectional view taken along the line VI—VI of FIG. 5.

The structural timber C shown in FIGS. 5 and 6 is of a construction in which a metal net 16a similar to the metal net 16 used in the preceding Example 2 is placed on the metal net 16 and the two nets 16 and 16a are stapled together. If required, several or more than two nets may be stapled together. The reference characters in FIGS. 5 and 6 that are identical with those in FIGS. 3 and 4 designate the portions and elements that are of the same construction.

The structural timbers of the invention are made in the manner described above, and in these timbers the sheet like bases 1 and 11 may be either veneer or plywood. The inorganic fibers, as described, are formed into something like a felt material and mat or sheet and are effective for insulating against sound and heat. As for the dampproof sheet like materials 3, 13 and 15 the materials used include asphalt felt, cardboard, and a variety of roofing materials. The metal net like materials 4, 16 and 16a are wire net materials which include metal lath or wire lath, the metal lath being mostly produced by forming numerous scores on a thin metal sheet and expanding the sheet, and the wire lath being mostly made of wire net and sometimes of chains. The staples 5 and 17 straddle the crossed portions of the metal nets 4, 16 and 16a and pierce the inorganic fiber sheet like materials 2, 14 and base materials 1 and 11 in succession and staple and tightly hold the members altogether. The points of stapling of the staples 5 and 17 are those considered most effective physically and functionally and which enhance the decorative design with staples 5 and 17. The structural timbers A, B and C provided in this manner as described in the preceding examples prevent permeation of moisture because of the arrangement of the various members and also serves to provide heat insulation. Namely moisture and heat effects from the surface of the structural timbers and also from the spaces of the base material 12 on the underside can be prevented by the dampproof sheet like material. Therefore, the inorganic fiber felt like materials 2, and 14 function to reduce humidity contained in the air on the underside of the structural timbers by capillary, atomizing and vaporizing actions which apparently are brought about by the respective fiber and the air contained therebetween. Also, since the respective dampproof sheet like material and inorganic fiber like material stapled together with staples 7 become rugged on the surface by the stapling force of the staples 7, they are resilient on the surface and expedite the vaporization of moisture by their expansion and contraction. The inorganic fiber felt like material functions as if it were a partition wall and can effect evaporation on the average. In this manner, the members are stapled together integrally with one another, and accordingly they are resilient and liable to draught and insulate sound and heat by the inorganic felt like material layer of the members. Since the structural timber made up of the members thus described is high in stability and hence increases the stability of a structure constructed with such timbers and also makes it easy to execute and work with, it is suitable as a structural timber for use in building and construction jobs and particularly very easy and convenient for use in cement plastering and renders it possible to construct a building which is excellent in essential living conditions.

A description will now be set forth of a device for manufacturing the structural timbers shown in the embodiments heretofore described with reference to FIGS. 7 through 10. For the sake of convenience's, a description will be made of the manufacture of the embodiment of the structural timber A shown in FIGS. 1 and 2.

Figure 7:
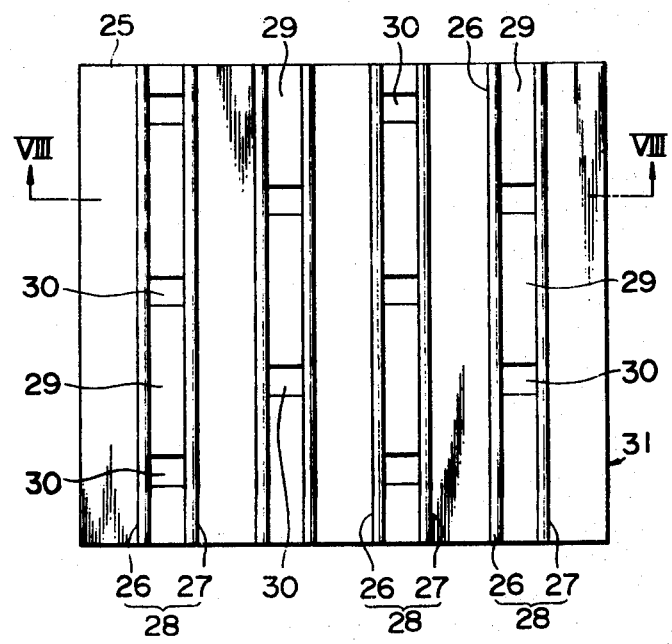
FIG. 7 is a plan view of a guide block used for applying staples.
Figure 8:
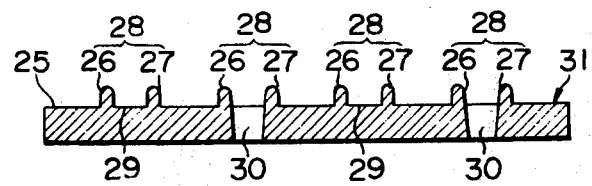
FIG. 8 is a sectional view taken along the line VIII—VIII of FIG. 7.
Figure 9:
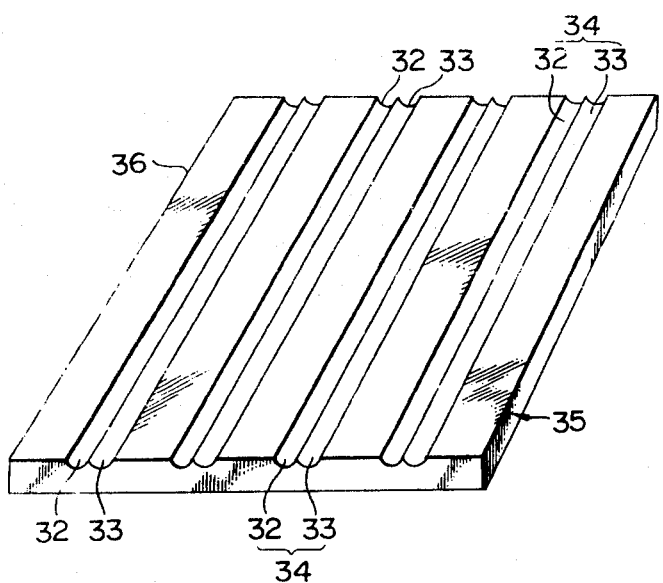
FIG. 9 is a perspective view of a receiving block used for applying staples.

This manufacturing device is a device for manufacturing structural timbers and comprises a guide block generally indicated at 31 and a receiving block generally indicated at 35, the guide block, 31 as shown in FIGS. 7 and 8, is made of a plate 25 made from a hard material such as metal and is formed on the surface with a plurality of groove rails 28 formed of opposed raised rails 26 and 27 and with holes 30 formed at specified spaced apart locations in the bottom 29 of each of the groove rails, the receiving block, as shown in FIG. 9, is made of a hard plate 36 and is formed on the surface with a plurality of receiving grooves 34, the receiving grooves 34 are made up respectively of two concave arcuatebottomed grooves 32 and 33 which are formed adjacent and parallel to one another and are spaced apart the same amount as the groove rails 28 of the guide block 31, the guide block 31 is designed in its construction to receive a staple (not shown) loosely into the groove rails 28 thereof.

Figure 10:
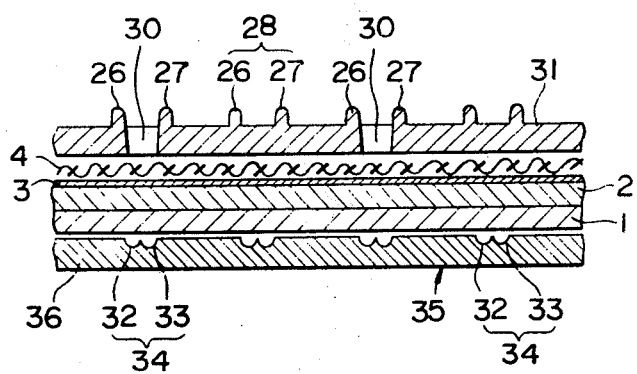
FIG. 10 is a sectional view showing the guide block and receiving block in position for applying staples.

Referring now to the manufacture of the heretofore described structural timbers according to the invention, the sheet like base material 1, inorganic fiber felt like material 2, dampproof sheet like material 3 and metal net 4 are laid in order over the surface of the receiving block 35 as shown in FIG. 10, and thereafter the guide block 31 is placed on the metal net 4. Because at this time the groove rails 28 of the guide block 31 above the net 4 and the receiving grooves 34 of the receiving block 35 below the base material 1 are designed to be aligned in position with each other, when the stapler (not shown) which is initially fitted loosely into the groove rails 28 and which is operated in the location of holes 30 while the stapler is being slid along the rails 28, wire-made U-shaped staples 5, straddling the crossed portions of the metal net 4, pierce the dampproof sheet like material 3, inorganic fiber felt like material 2 and sheet like base material 1 successively, and has its ends strike against the receiving grooves 34 of the receiving block 35, whereby both lower ends of the staple 5 are bent in accordance with the shape of the concave grooves 32 and 33, so that the members laid one over another are stapled together integrally and tightened. With the holes 30 in the guide block 31 being formed in the bottom 29 of each of the groove rails 28 at specified spaces and in staggered array with respect to the holes 30 of an adjacent rail 28, the holes 30 are spaced equal in distance to one another, so that the staples 5, when stapled, present an even appearance and not only produce sufficient physical and functional effects but also look beautiful in outer appearance from the viewpoint of decorative design.

What is claimed is:

1. A structural timber for use in building construction comprising means defining a wood base material means, a felt-like material disposed on said base material means, said felt-like material consisting of a mass of inorganic fibers having air spaces therebetween, a dampproof sheet-like material disposed on said felt-like material, a metal net-like material disposed on said dampproof sheet-like material, and a plurality of spaced staples holding said materials together, said staples passing entirely through said metal net-like material, said dampproof sheet-like material, said felt-like material, and said wood base material means, said staples each having a U-shaped configuration including two leg portions joined to a connecting portion and turned-in end sections on the ends of said leg portions, said turned-in end sections being disposed on the outer surface of said wood base material means to prevent withdrawal of said staples, said connection portion of said U-shaped staples engaging said metal net-like material along spaced locations of the latter, said staples defining a substantially fixed space between said metal net-like material where the latter is engaged by said staples and said wood base material means, said dampproof sheet-like material and said felt-like material being confined within said substantially fixed spaces such that the air spaces are maintained in said felt-like material, thereby maintaining the sound and heat insulation properties thereof.

2. A structural timber according to claim 1 wherein a second dampproof sheet-like material is disposed on said wood material means.

3. A structural timber according to claim 1 wherein said base material means includes a plurality of elongated, sheet-like strips of base material, said strips being spaced from one another.

4. A structural timber according to claim 1 including a second dampproof sheet-like material between said inorganic fiber felt-like material and said wood base material means, said staple means tightly holding said materials together including both of said dampproof sheet-like materials.

5. A structural timber according to claim 1 including a second metal net-like material disposed over the first said metal net-like material, said staple means tightly holding said materials together including both of said metal net-like materials.

6. A structural timber according to claim 1 wherein said dampproof sheet-like material is asphalt felt.

7. A structural timber according to claim 1 wherein said dampproof sheet-like material is cardboard.

* * * * *